(12) United States Patent
Beatrez

(10) Patent No.: US 10,669,145 B2
(45) Date of Patent: Jun. 2, 2020

(54) BEVERAGE CONTAINMENT, CARBONATION AND SERVING SYSTEM AND METHOD

(71) Applicant: Alan Anthony Beatrez, Prior Lake, MN (US)

(72) Inventor: Alan Anthony Beatrez, Prior Lake, MN (US)

( * ) Notice: Subject to any disclaimer, the term of this patent is extended or adjusted under 35 U.S.C. 154(b) by 256 days.

(21) Appl. No.: 15/924,111

(22) Filed: Mar. 16, 2018

(65) Prior Publication Data

US 2019/0284040 A1    Sep. 19, 2019

(51) Int. Cl.
| | |
|---|---|
| *B01F 3/04* | (2006.01) |
| *A23L 2/00* | (2006.01) |
| *B67D 1/16* | (2006.01) |
| *C12C 13/10* | (2006.01) |
| *B65D 8/00* | (2006.01) |
| *C12C 11/11* | (2019.01) |
| *B01F 13/04* | (2006.01) |
| *B67D 1/00* | (2006.01) |

(52) U.S. Cl.
CPC ............... *B67D 1/16* (2013.01); *A23L 2/00* (2013.01); *B01F 3/04106* (2013.01); *B01F 3/04787* (2013.01); *B01F 3/04808* (2013.01); *B01F 13/042* (2013.01); *B65D 7/045* (2013.01); *C12C 11/11* (2013.01); *C12C 13/10* (2013.01); *B01F 2003/049* (2013.01); *B67D 2001/0093* (2013.01)

(58) Field of Classification Search
CPC .......... A23L 2/00; B01F 3/04; B01F 3/04787; B01F 3/04808; B01F 3/04099; B01F 3/04106
See application file for complete search history.

(56) References Cited

U.S. PATENT DOCUMENTS

| | | | |
|---|---|---|---|
| 4,440,318 A | * | 4/1984 Berger | ................. B67D 1/0035 137/635 |
| 2018/0072972 A1 | * | 3/2018 Shin | ........................ C12C 13/10 |

* cited by examiner

*Primary Examiner* — Robert A Hopkins

(57) ABSTRACT

A beverage containment, carbonation and serving system and method whereby the system is limited dimensionally to be placed and used inside of and fit within a standard shelving space of a conventional refrigerator. The beverage containment, carbonation and serving system and method comprises a horizontally positioned vessel, a vessel base, gas inlet and liquid outlet ports, a liquid dip tube extending from the outlet port of the vessel to the intersecting point of the vessel bottom and the opposite vessel end, an integral faucet with a vertically low-profile activation handle and an interlocking removable drip tray at one end of the vessel for liquid serving purposes.

10 Claims, 6 Drawing Sheets

BEVERAGE CONTAINMENT, CARBONATION AND SERVING SYSTEM AND METHOD

CROSS-REFERENCE TO RELATED APPLICATIONS

Not applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION BY-REFERENCE OF MATERIAL SUBMITTED ON A COMPACT DISC

Not Applicable

BACKGROUND OF THE INVENTION

After beer has been fermented in the beer brewing process, commercial beer producers and home brewers can use reusable steel kegs to store the fermented, uncarbonated beer. Kegs range in size from approximately two to sixteen gallons and are constructed to withstand pressure up to 130 PSI to enable holding the beer under pressure. The pressurization of the vessel serves multiple purposes. Pressurizing the keg with carbon dioxide is a method used to force carbonate the uncarbonated beer. After the beer is carbonated, the pressure can then be reduced to maintain the carbonation level and to facilitate serving the beer from the keg.

When the beer in the keg is to be served, the keg is placed in a vertical position so the gas inlet for pressurization and the beverage outlet port are physically located on the top side of the keg. The vertical orientation is necessary to enable dispensing all liquid in the keg because the internal liquid dip tube in fluid communication to the beverage outlet port is axially centered and extends to the base of the keg. If the keg were placed in a horizontal orientation, the last half of the liquid volume wouldn't be able to be evacuated from the keg because it would no longer be in fluid communication with the liquid dip tube after the fluid level goes below the liquid dip tube.

Prior to serving, the beer can be cooled in the kegs by placing the keg in a short-term ice bath or in a relatively expensive specialized, dedicated refrigeration system large enough to hold one or more vertical kegs. After the beer is cooled to serving temperature, it is then forced out of the keg via the pressurized gas connected to and entering the keg. The beer can be served from the keg using a number of different configurations including attaching a tap assembly or a liquid line to transfer the beer for dispensing. The liquid line would be connected to a simple faucet or to a more complex setup consisting of a tower assembly with one or more ornamental faucets which would be used to dispense the beer into a drinking glass.

(1) Field of the Invention

Embodiments of the invention relate to a reusable beverage containment, carbonation and serving system and method with the system dimensioned and oriented to enable using a conventional household refrigerator shelving area for storing and cooling the contents of the system and configured to carbonate and directly dispense the contents of the system when desired.

(2) Description of Related Art

U.S. Patent Documents

| | | |
|---|---|---|
| 9,803,163 B2 | October 2017 | Pellaud et al. |
| 9,670,049 | June 2017 | Apps |
| 9,611m131 | April 2017 | Lehman |
| 9,546,021 B2 | January 2017 | Stover et al. |
| 9,469,234 B2 | October 2016 | White et al. |
| 9,428,720 | August 2016 | Lehman |
| 9,394,155 | July 2016 | Phallen, et al. |
| 9,027,792 | May 2015 | Watts |
| 8,833,405 | September 2014 | Phallen et al. |
| 8,672,200 | March 2014 | O'Hare |
| 8,070,023 | December 2011 | Vitantonio et al. |
| 7,757,908 | July 2010 | Buhl, Jr. |
| 6,820,775 | November 20014 | Meike et al. |
| 6,481,238 | November 2002 | Jennings et al. |
| 5,564,602 | October 1996 | Cleland et al. |
| 5,165,569 | November 1992 | Furuhashi et al. |
| 5,129,552 | July 1992 | Painchaud et al. |
| 5,115,841 | May 1992 | Horino, et al. |
| 5,110,012 | May 1992 | Scholle et al. |
| 5,096,095 | March 1992 | Burton |
| 4,869,396 | September 1989 | Horino, et al. |
| 4,735,348 | April 1988 | Santolemmo |
| 4,520,950 | June 1985 | Jeans |
| 4,264,019 | April 1981 | Roberts et al. |
| 4,032,047 | June 1977 | Wilson |
| 3,561,649 | June 1968 | Wilson |

BRIEF SUMMARY OF THE INVENTION

To overcome the aforementioned disadvantages and limitations of current beverage containment, carbonation and serving devices and practices, disclosed is a beverage containment, carbonation and serving system and method which eliminate the unfavorable aspects of the current devices and practices. With the widespread and growing popularity of home beer brewing and the aforementioned disadvantages of the current devices and practices, an improved approach is highly desired.

An embodiment of the present invention includes the horizontal placement and use of a keg and system components sized and oriented to fit within the shelving space of a conventional refrigerator appliance. Additional embodiments of the present invention comprise of a vessel access hole and lid with a sealing and clamping mechanism, gas inlet and liquid outlet ports, dispensing faucet with a low-profile activation handle, a keg base with an interlocking removable drip tray assembly.

These and other features, aspects, and advantages of the present invention will become better understood with reference to the following description and claims.

BRIEF DESCRIPTION OF THE SEVERAL VIEWS OF THE DRAWING(S)

DETAILED DESCRIPTION OF THE INVENTION

Figure 1:
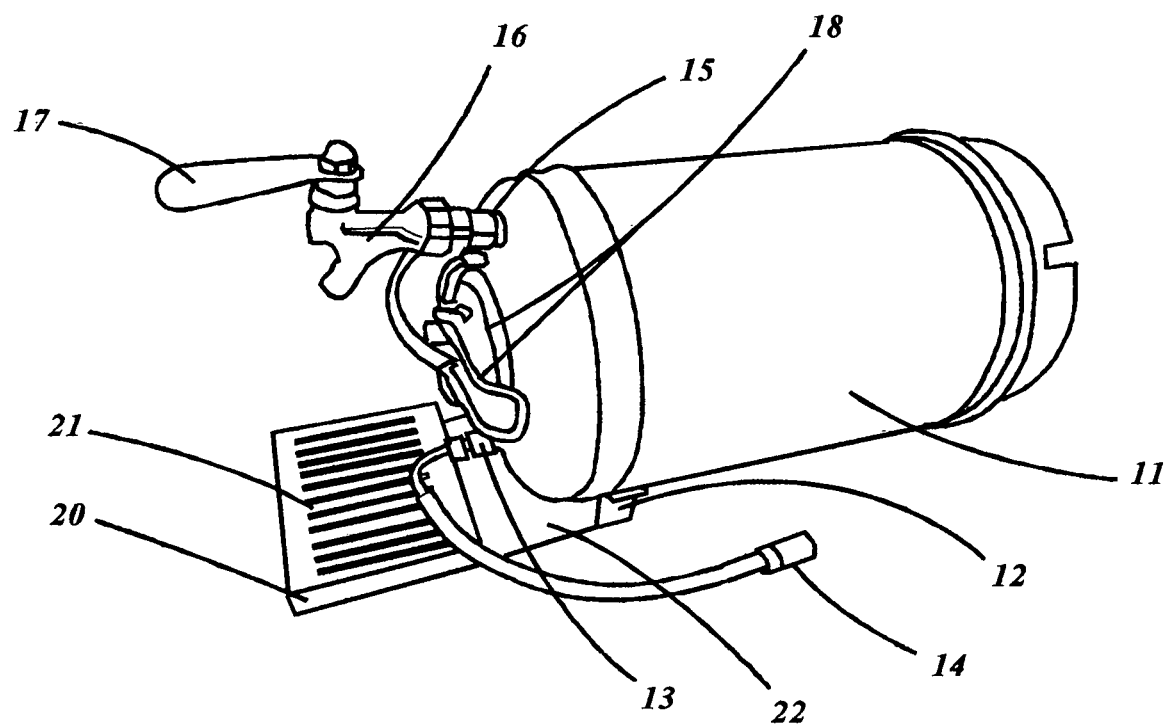
FIG. 1 is a perspective view of the beverage containment, carbonation and serving system embodiments of the present invention.

Although detailed embodiments of the invention are disclosed herein, it is to be understood that the disclosed embodiments are merely exemplary of the invention that may be embodied in various and alternative forms. Specific structural and functional details disclosed herein are not to be interpreted as limiting, but merely as a basis for teaching one skilled in the art to variously employ the integrated beverage containment, carbonation and serving system embodiments. Within the drawing, like elements are given like numerals.

Reference is now made to FIGS. 1-6 of the drawings which illustrate one exemplary embodiment of a reusable beverage containment, carbonation and serving system and method of this invention which is particularly adapted, dimensioned and oriented to enable using a conventional household refrigerator shelving area for storing and cooling the contents of the system and configured to carbonate and directly dispense the contents of the system when desired.

Beverage containment vessel 11 is configured to hold two to six gallons of liquid and is constructed of a rigid material that will withstand internal pressure to about 130 PSI to permit the required pressurization of the liquid with carbon dioxide gas to force carbonate the liquid and or to enable dispensing the liquid. The general orientation of vessel 11 is horizontal to minimize required vertical storage space. Vessel base 12 provides orientation support for vessel 11 to ensure axial orientation for the outlet port 15 and faucet 16 to dispense liquid from the vessel 11 and it provides horizontal orientation to contribute a slight elevation to the dispensing end of the vessel 11 to ensure gravity flow of liquid towards the liquid dip tube fluid communication inlet 25. The pressurization of the vessel 11 is accomplished by an inlet port 13 on the vessel 11 in fluid communication with a fitting 14 to connect to a source of regulated pressurized carbon dioxide gas.

Referring to FIGS. 1, 2, 3 and 6, the dispensing faucet 16 is illustrated with a vertically low-profile activation handle 17, generally horizontal, further minimizing the required vertical storage space of the system. The dispensing faucet 16 is attached to the outlet port 15 in fluid communication with an internal liquid dip tube 24.

Figure 2:
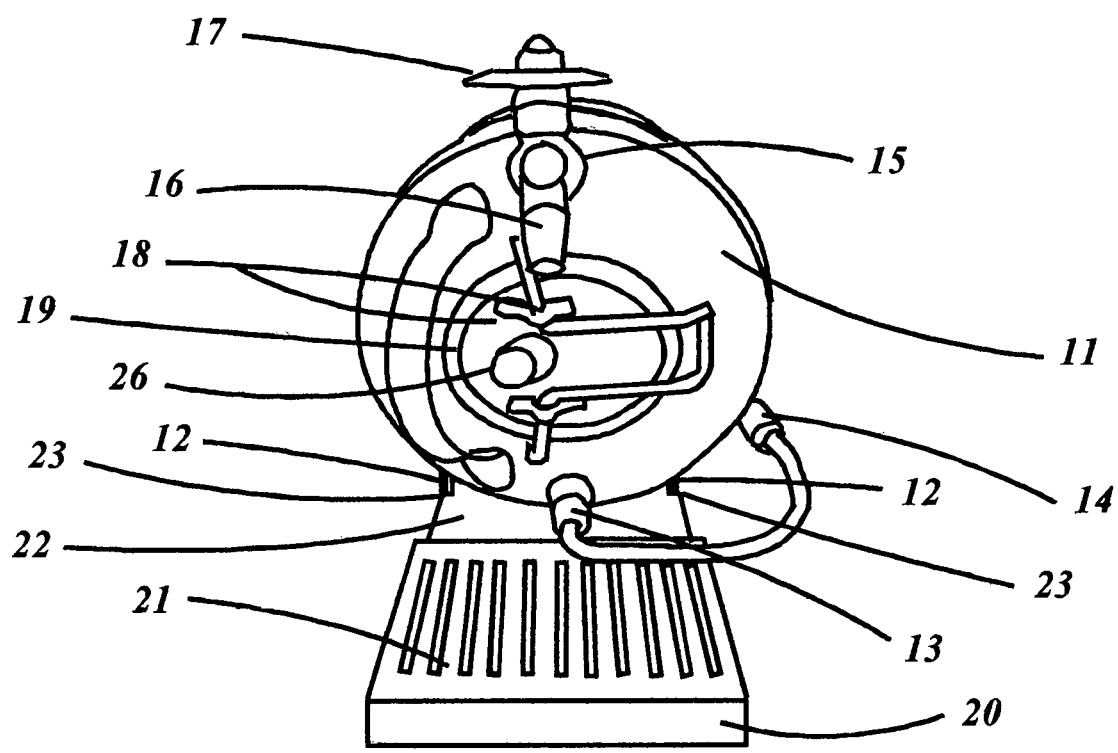
FIG. 2 is a front view of the beverage containment, carbonation and serving system from FIG. 1.

Referring to FIG. 2, vessel 11 also comprises an access hole 19 and a removable sealing lid with a clamping retention mechanism 18 to enable cleaning and filling the vessel 11 for use or reuse. The vessel 11 also comprises a pressure relief valve 26 to allow pressure above the predetermined set pressure of the valve 26 to escape from the vessel 11 if an over pressurization of the vessel 11 were to occur. This protects the vessel 11 from being subjected to pressures that exceed its design limit.

Figure 3:
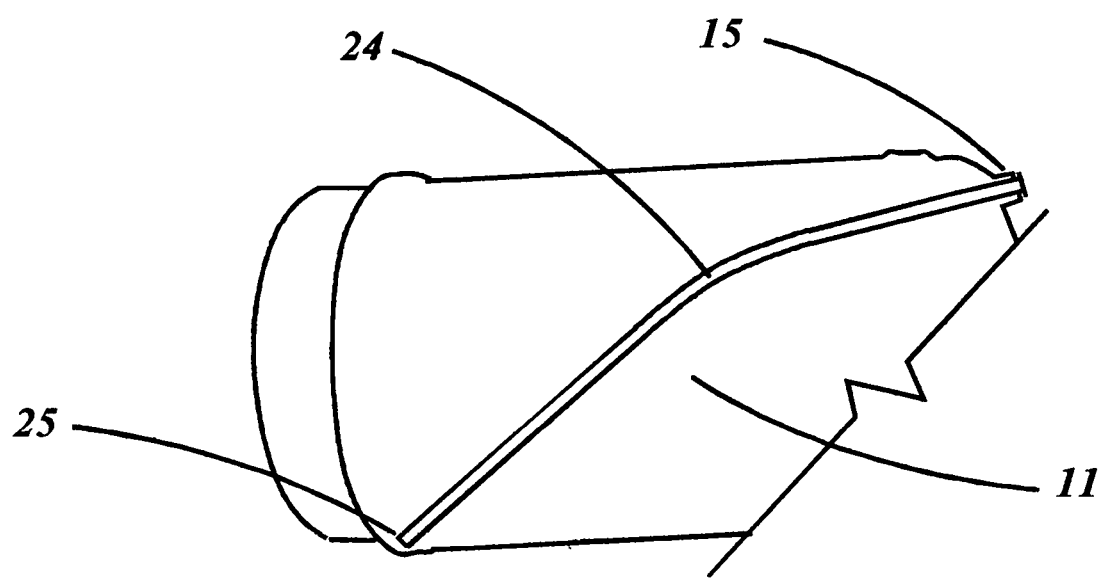
FIG. 3 is a cross sectional view of the vessel from FIG. 1 showing the liquid dip tube in fluid communication to the outlet port, contoured to provide a fluid communication inlet at an intersecting point of the vessel bottom and the opposite vessel end.

Referring to FIG. 3, the liquid dip tube 24 in fluid communication to the outlet port 15 is illustrated generally contoured to provide a fluid communication inlet 25 at an intersecting point of the vessel bottom and the opposite vessel end. This allows all liquid in the vessel 11 to gravity feed towards the fluid communication inlet 25 while the system is in the horizontal orientation for general use. The liquid dip tube 24 configuration also allows liquid to be evacuated from the vessel 11 when placed in a vertical orientation for the purpose of cleaning the vessel 11 assembly for reuse.

Figure 4:
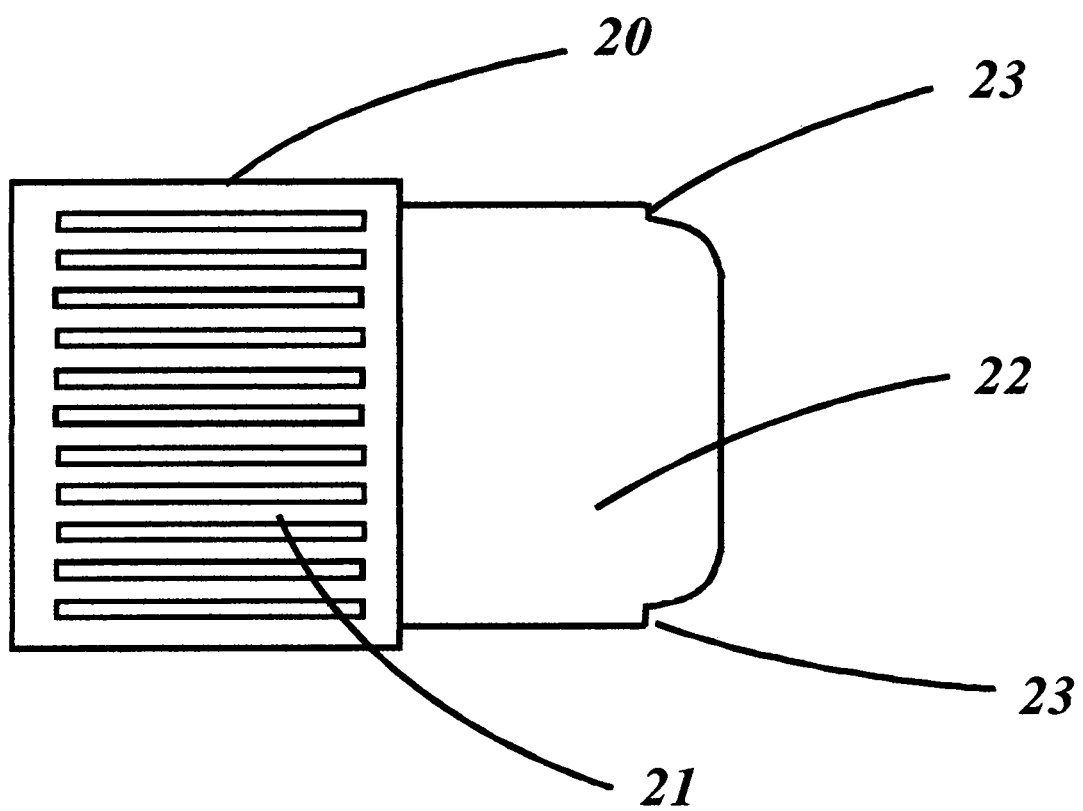
FIG. 4 is a top view of the interlocking removable drip tray of FIG. 1.
Figure 5:
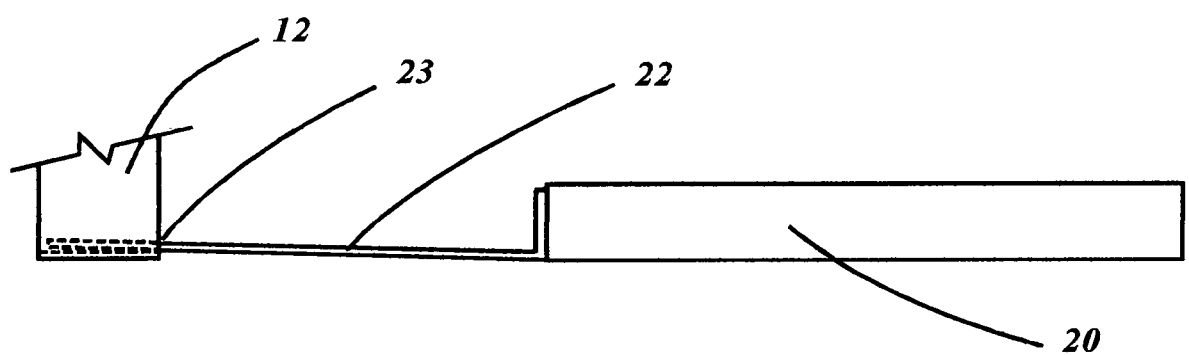
FIG. 5 is a side view of the vertical legs of the keg base and the interlocking removable drip tray.
Figure 6:
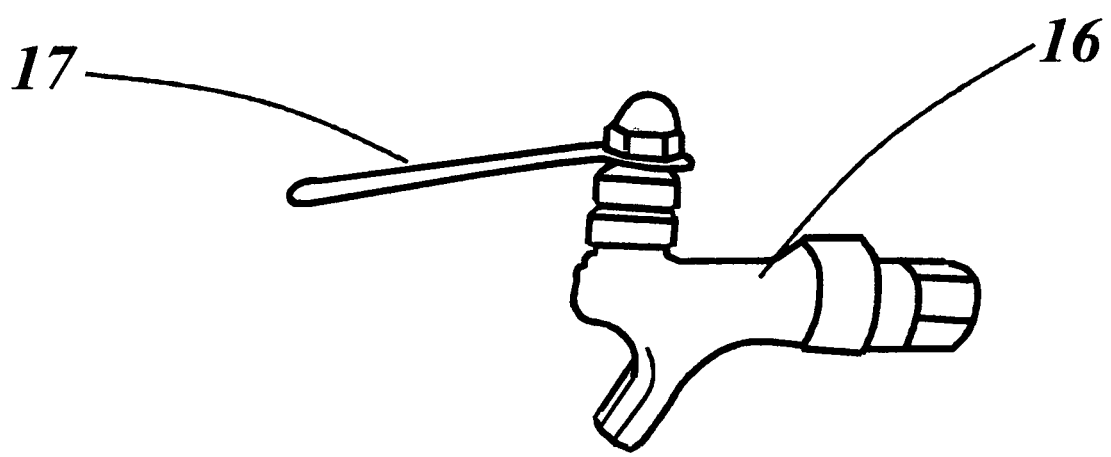
FIG. 6 is a side view of the vertically low-profile activation handle mounted on the liquid dispensing faucet of FIG. 1.

Referring to FIGS. 4 and 5, the interlocking removable drip tray assembly comprised of a drip tray basin 20, grate 21 and alignment plate 22 is positioned for use by sliding the interlocking removable drip tray assembly beneath the serving end of the vessel 11 until the two interlocking drip tray positive stops 23 make contact and interlock with the two vertically positioned legs 12 of the vessel base structure. When in use, the drip tray basin captures any waste liquid from the process of dispensing liquid from the vessel 11.

The aforementioned system and method description is not to be interpreted to exclude other beverage containment, carbonation and serving system and methods advantageously employing the present invention. Furthermore, it is to be understood that the above-mentioned beverage containment, carbonation and serving system and method is mainly an illustrated embodiment of the principles of this invention and other arrangements and advantages may be derived by those skilled in the art without departing from the spirit and scope of the invention.

What is claimed is:

1. A beverage containment, carbonation and serving system comprising: a vessel to contain liquid under pressure including a vessel base, access hole and sealing lid with clamping mechanism, a pressure relief valve, inlet and outlet ports, the vessel containing capacity for multiple servings of liquid, the ports including an inlet port to allow the delivery of regulated pressurized gas into the vessel and an outlet port to dispense liquid from the vessel, an inlet port in fluid communication with a fitting to connect to a source of regulated pressurized gas, an outlet port including a fitting and attached dispensing faucet to dispense liquid from the vessel, a dispensing faucet with a vertically low-profile activation handle, an outlet port in fluid communication with an internal liquid dip tube extending from the outlet port fitting down to the intersecting point of the vessel bottom and the opposite vessel end, a vessel base structure to provide axial orientation for the outlet port and faucet for dispensing liquid and slight elevation for the dispensing end of the vessel to gravity flow liquid towards the liquid dip tube fluid communication inlet including vertically positioned legs to guide and position an interlocking removable drip tray to be used to capture waste liquid generated while dispensing liquid, an interlocking removable drip tray with an integral alignment plate to guide, align and position relative to the vertically positioned legs of the vessel base structure and to allow the drip tray to be readily removed for cleaning, a vessel access hole and associated sealing lid with a clamping mechanism that is removable to enable cleaning the vessel and filling the vessel for use or reuse.

2. The system of claim 1, wherein said beverage containment, carbonation and serving system includes a vessel volume that ranges from two to six gallons to be placed and used inside of and fit within a standard shelving space of a conventional refrigerator.

3. The system of claim 1, wherein said vessel volume ranges from two to six gallons and is comprised of a rigid material to withstand internal pressure to about 130 PSI to permit carbonation and or serving of stored liquid.

4. The system of claim 1, wherein said vessel includes said access hole and a removable sealing lid with clamping mechanism to enable cleaning the vessel and filling the vessel for use or reuse.

5. The system of claim 1, wherein said internal liquid dip tube in fluid communication to the outlet port is rigid and contoured to provide said fluid communication inlet at an intersecting point of said vessel bottom and the opposite vessel end.

6. The system of claim 1, wherein said dispensing faucet is in fluid communication with the internal liquid dip tube of claim 5 through said outlet port fitting located on the vessel end, towards the top edge of the vessel and vertically aligned with the centerline of the vessel.

7. The system of claim 1, wherein said vertically low-profile activation handle mounts and operates in a generally horizontal orientation on said dispensing faucet of claim 6.

8. The system of claim 1, wherein said vessel base provides axial orientation for the outlet port and said dispensing faucet for liquid dispensing and slight elevation for dispensing end of said vessel to gravity flow liquid towards the liquid dip tube fluid communication inlet and the vertically positioned leqs to guide and position said interlocking removable drip tray to be used to capture waste liquid while serving.

9. The system of claim 1, wherein said interlocking removable drip tray has the integral alignment plate to guide, align and position it relative to said vertically positioned leqs of the vessel base structure of claim 8.

10. The system of claim 1, wherein the space between said dispensing faucet and said interlocking removable drip tray allows clearance for dispensing liquid into a drinking apparatus.

* * * * *